UNITED STATES PATENT OFFICE.

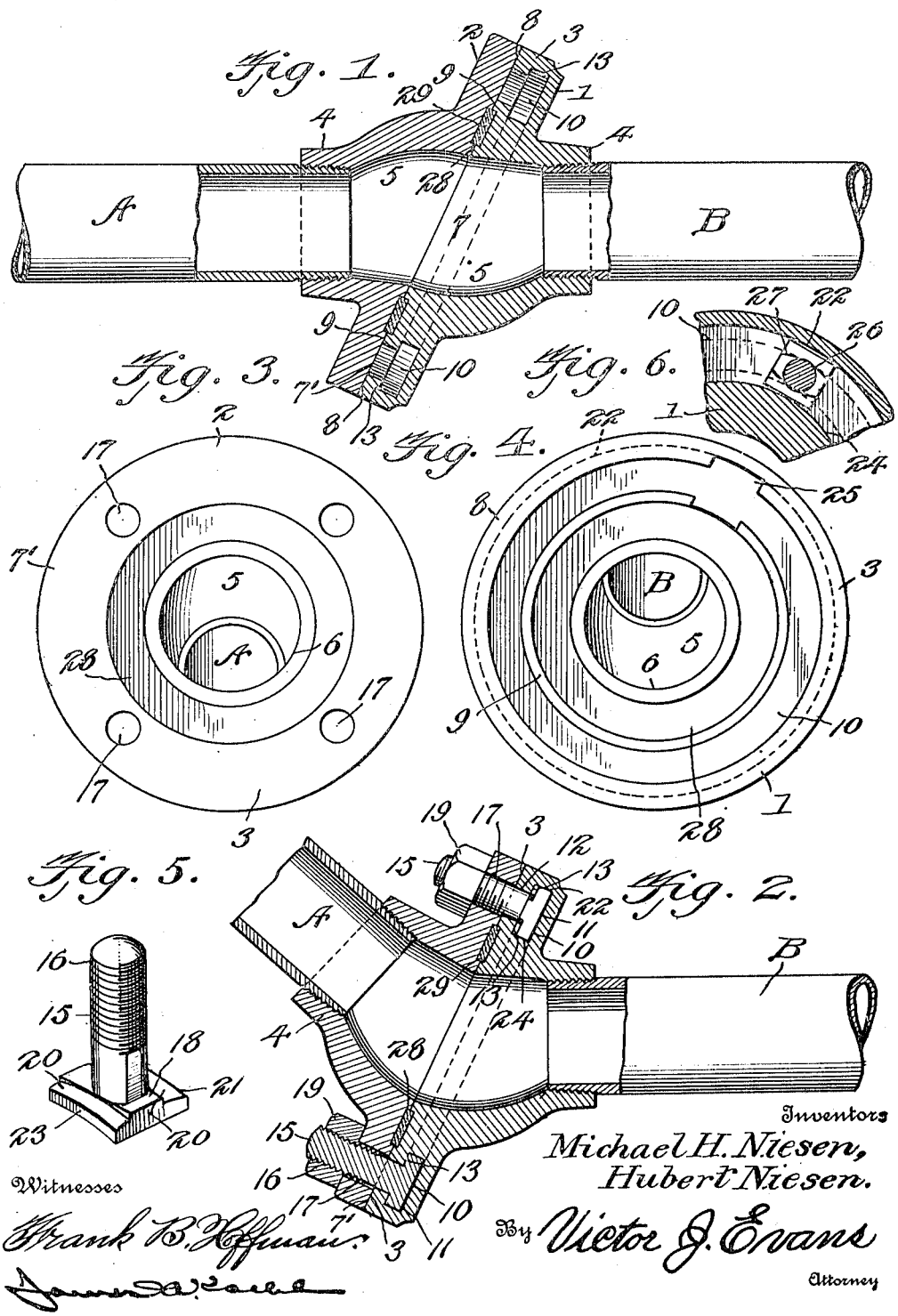

MICHAEL H. NIESEN AND HUBERT NIESEN, OF KAUKAUNA, WISCONSIN.

UNIVERSAL PIPE-COUPLING.

1,020,839.  Specification of Letters Patent.  Patented Mar. 19, 1912.

Application filed March 21, 1911. Serial No. 615,845.

*To all whom it may concern:*

Be it known that we, MICHAEL H. NIESEN and HUBERT NIESEN, citizens of the United States, residing at Kaukauna, in the county of Outagamie and State of Wisconsin, have invented new and useful Improvements in Universal Pipe-Couplings, of which the following is a specification.

This invention relates to universal pipe coupling, the object of the invention being to provide an improved coupling which may be operated so as to hold the pipe sections either in the same general plane with each other or at any desired angle and to provide in the coupling companion coupling elements which are constructed so that when the pipe sections are adjusted to occupy the same general plane an unobstructed passage in direct line with the passageway of the pipe sections will be formed.

Another object of the invention is to provide improved fastening devices adjustably connecting the companion elements of the coupling with each other, the said clamping devices being constructed so as to permit the said companion members to be adjusted without any possibility of one member binding on the other.

In the drawing, forming a portion of this specification and in which like numerals of reference indicate similar parts in the several views:—Figure 1 is a section through our improved coupling showing pipe sections operatively connected therewith and occupying the same general plane with each other, portions of the said pipe sections being shown in full lines. Fig. 2 is a view similar to Fig. 1 showing the companion members of the coupling adjusted so that the pipe sections are arranged at an angle with respect to each other. Fig. 3 is an elevation of one of the companion members of the coupling. Fig. 4 is a similar view of the other member of the coupling. Fig. 5 is a perspective view of one of the clamping devices. Fig. 6 is a section through a portion of one of the members of the coupling showing a slightly modified form of clamping device engaged therewith.

On reference to the drawing, it may be described that our improved pipe coupling embodies companion members 1 and 2 each comprising a substantially flat disk 3 and a socket member 4, which latter is arranged at an angle with respect to the disk so as to permit of almost any required or desired angular adjustment of the pipe sections with respect to each other. For the purpose of clearness, the socket 4 of the member 2 has threadedly connected therewith one end of a pipe section A. The opposite companion member 1 has its socket member 4 identically connected with the adjacent pipe section B. On reference to Fig. 1 of the drawing it will be seen that each socket 4 is provided with an inner relatively large portion 5 whose walls are flared in the direction of the inner face of the disk so that an opening 6 is formed in the disk of each companion member of the coupling, the said portions 5 of the sockets being of a construction to provide a continuous passageway 7 to be formed immediately between the pipe sections when the sections are operatively connected with each other. The portions 5 of the sockets are concentric with respect to the companion members 1 and 2 so that, regardless of the adjustment of the said members 1 and 2, the passages 6 will always be in coincidence with each other and thereby provide an unobstructed passage between the pipe sections at all times.

The member 2 is provided with a relatively broad contacting surface 7' which is adapted to contact with the concentric surfaces 8 and 9 of the adjacent member 1. The surfaces 8 and 9 are formed particularly through the provision in the member 1 of a concentric continuous substantially T-groove 10, the said groove being provided with large and small communicating passages 11 and 12 respectively, the latter opening directly onto the inner surface of the member 1 and closed wholly by the surface 7' of the adjacent member 2 when both members are securely coupled together. By constructing the groove 10 of substantially T-form cross sectionally the large and small communicating passages 11 and 12 provide concentric shoulders 13 for a purpose to be hereinafter explained.

Clamping devices embodying bolts 15 are employed for connecting the companion members 1 and 2 of the coupling with each other. Each bolt is provided with a threaded shank 16 which extends through a corresponding passage 17 in the member 2 of the coupling, the head 18 of each bolt being disposed in the groove 10 of the member 1. Clamping nuts 19 on the bolts serve to hold the members 1 and 2 securely in contacting engagement with each other. The head of each bolt is provided on its inner surface with curved contacting surfaces 20 which are engaged against the shoulders 13 of the member 1 of the coupling, as shown in Fig. 2 of the drawing. It may be stated that the passages 17 in the member 2 of the coupling are somewhat larger than the diameter of the bolt shanks so as to permit of a slight rocking movement of the members 1 and 2 when the clamping nuts 19 are in their released positions. Incident to the provision of the curved surfaces 20 of the bolts it will be readily understood that when the clamping nuts 19 are released the heads may be rocked to a slight extent in the groove 10 so as to prevent binding of the members 1 and 2 against each other during their adjustment. Each bolt is provided on its outer surface with a convex surface 21 to engage the concaved surface 22 of the groove 10. Each head is also provided with an inner concaved surface 23 which contacts with the convex surface 24 of the groove. The member 1 has formed therein a receiving passage 25 to receive the headed ends of the bolts and to permit the bolts to be adjusted in the groove 10 so that the surfaces 20 hereinbefore referred to will underlie the shoulders 13.

We claim:—

A pipe coupling comprising relatively adjustable contacting members each provided with a socket portion, the contacting portion of one member having a groove therein, the contacting portion of the other member having a passage therein, the groove being formed to provide spaced shoulders, and a clamping bolt having a head portion mounted in the groove and having a shank portion extending through the passage, a part of the opposite lateral edges of the said head portion being curved to provide inner and outer concaved and convexed surfaces respectively, contacting with the corresponding walls of the groove, the said head being further provided with curved surfaces which are arranged in opposite relation with respect to the shoulders.

In testimony whereof we affix our signatures in presence of two witnesses.

MICHAEL H. NIESEN.
HUBERT NIESEN.

Witnesses:
C. DOUGLAS TOWSLEY,
F. A. TOWSLEY.